United States Patent [19]
Rhew et al.

[11] Patent Number: 5,966,299
[45] Date of Patent: Oct. 12, 1999

[54] BOOST AND BUCK CHOPPER TYPE POTENTIAL SOURCE EXCITATION SYSTEM FOR SYNCHRONOUS TYPE ELECTRIC POWER GENERATOR

[75] Inventors: Hong-Woo Rhew; Ick-Hyun Lim, both of Taejeon; Chan-Ki Kim, Choongju; Chang-Ki Jung, Taejeon, all of Rep. of Korea

[73] Assignee: Korea Electric Power Corporation, Seoul, Rep. of Korea

[21] Appl. No.: 08/959,656

[22] Filed: Oct. 28, 1997

[30] Foreign Application Priority Data

Nov. 11, 1996 [KR] Rep. of Korea ............................. 53259

[51] Int. Cl.$^6$ ...................................................... H02M 7/00
[52] U.S. Cl. .............................. 363/124; 363/60; 323/224
[58] Field of Search .................................. 363/59, 60, 61, 363/62, 89, 95, 98, 124; 323/205, 207, 208, 224

[56] References Cited

U.S. PATENT DOCUMENTS

| | | | |
|---|---|---|---|
| 4,352,055 | 9/1982 | McCartney | 323/263 |
| 4,384,321 | 5/1983 | Rippel | 363/124 |
| 4,489,371 | 12/1984 | Kernick | 363/41 |
| 4,654,770 | 3/1987 | Santurtun et al. | 363/17 |
| 4,941,079 | 7/1990 | Ooi | 363/132 |
| 4,984,148 | 1/1991 | Edwards | 363/95 |
| 5,138,250 | 8/1992 | Capel | 323/283 |
| 5,177,677 | 1/1993 | Nakata et al. | 363/89 |
| 5,371,666 | 12/1994 | Miller | 363/98 |
| 5,514,915 | 5/1996 | Kim et al. | 307/64 |
| 5,661,394 | 8/1997 | Nakao et al. | 323/222 |

*Primary Examiner*—Adolf Deneke Berhane
*Attorney, Agent, or Firm*—Watson Cole Grindle Watson P. L. L. C.

[57] ABSTRACT

A boost and buck chopper type potential source excitation system for a synchronous type electric power generator which is capable of having an operational characteristic which is better than that of a conventional voltage source excitation system with respect to a rated input voltage and forcing an excitation field by boosting an excitation input voltage using a boost chopper when an excitation input voltage is decreased due to a failure in a cable. The system includes a boost chopper for receiving an output voltage from the buck transformer, converting the thusly received voltage into a direct current voltage, adjusting a level of the same, outputting the same to the thyristor as an excitation voltage, boosting the direct current voltage when the output voltage from the electric power generator is decreased, and outputting the thusly boosted voltage to the thyristor.

11 Claims, 8 Drawing Sheets

BOOST AND BUCK CHOPPER TYPE POTENTIAL SOURCE EXCITATION SYSTEM FOR SYNCHRONOUS TYPE ELECTRIC POWER GENERATOR

BACKGROUND OF THE INVENTION

1. Field of the Invention

The present invention relates to a boost and buck chopper type potential source excitation system for a synchronous type electric power generator, and in particular, to an improved boost and buck chopper type potential source excitation system for a synchronous type electric power generator which is capable of having an operational characteristic which is better than that of a conventional voltage source excitation system with respect to a rated input voltage and forcing an excitation field by boosting an excitation input voltage using a boost chopper when an excitation input voltage is decreased due to a failure in a cable.

2. Description of the Conventional Art

The electric power P which is generated by an electric power generator is determined by a transmission terminal voltage $E_s$, a receiving terminal voltage $E_r$, and a value $P=(E_s \times E_s \times \sin\theta)/X_e$ which is obtained by multiplying a since value of a transmission terminal voltage phase difference angle and then dividing the value by a cable impedance $X_e$. Therefore, as the terminal voltage of the electric power generator which is a transmission terminal voltage, is decreased, the transmission electric power is decreased thereby. In addition, the excitation input voltage and the excitation current are decreased thereby. As the excitation current is more decreased, the terminal voltage is more decreased thereby. The electric power generator is operated at a high speed due to an imbalance between the mechanical input and electrical output of the synchronous electric power generator. If the sing value exceeds an angle of 90°, the operation of the electric power generator is synchronously interrupted, and the electric power generator becomes out of control from the system, thus causing an unstable system.

FIG. 1 illustrates a conventional potential source excitation system for a synchronous type electric power generator.

As shown therein, the conventional potential source excitation system for a synchronous type electric power generator includes an electric power generator 2, a buck transformer 5 for buck-transforming an output voltage from the electric power generator 2 into a voltage for exciting the electric power generator 2, a thyristor 10 for supplying the output voltage from the voltage transformer 5 to a field element 2a of the electric power generator 2, an initial excitation switch 1 for supplying an electric power to the field element 2a of the electric power generator 2 for an initial excitation, an ignition angle controller 9 for controlling a gate of the thyristor 10 in order to control an excitation voltage supplied to the field element 2a of the electric power generator 10, a current transformer 3 for detecting an output current from the electric power generator 2, a transformer 4 for detecting an output voltage from the electric power generator 2, an automatic control setting unit 6 for setting a control value for automatically controlling the output voltage from the electric power generator to a predetermined voltage, an automatic controller 7 for receiving a detection current from the current transformer 3, a detection voltage from the transformer 4 and an output voltage from the voltage transformer 5, receiving a control value from the automatic control setting unit 6, and outputting a control signal for controlling an excitation current in order for the output voltage from the electric power generator 2 to be a predetermined voltage, a manual control setting unit 11 for setting a control value in order to manually control the output voltage from the electric power generator 2, a manual controller 12 for comparing the control value from the manual control setting unit 11 with an output voltage from the thyristor 10 and generating a control signal in order to control an ignition angle, and an ignition angle controller 9 for selectively receiving a control signal from the manual controller 12 or a control signal from the automatic controller 7 through a selection switch 8 which is manually operated by an operator and controlling an ignition angle of the thyristor 10.

The initial excitation switch 1 is a switch for supplying an initial driving excitation power to the field element 2a of the electric power generator 2 when the electric power generator 2 is in a non-voltage state. After the initial excitation is performed, when the electric power generator 2 is normally operated, the output voltage from the electric power generator 2 is bucked by the potential power transformer 5, and the excitation power is supplied to the field element 2a of the electric power generator 2 through the thyristor 10. At this time, the gating angle of the thyristor 10 is controlled, and the current of the field element 2a of the electric power generator is controlled. In the normal state, the automatic controller 7 generates an ignition angle control signal of the thyristor 10 so that the output voltage from the electric power generator 2 becomes a set value of the automatic control setting unit 6 which is a request set value, and the ignition angle controller 9 controls an ignition angle of the thyristor 10 in accordance with the gating angle control signal.

In addition, if a failure occurs in the automatic control system, or when an operator wishes to manually control the electric power generator terminal voltage, the switch 8 is operated so that the control signal from the manual controller 12 is inputted into the ignition angle controller 9. The manual controller 12 outputs a control signal to the ignition angle controller 9 in accordance with a control value from the manual control setting unit 11, and the ignition angle controller 9 controls the ignition angle of the thyristor 10.

In the conventional potential source excitation system for a synchronous type electric power generator, an electric power is received from the output terminal of the electric power generator 2 through the buck transformer 5, and the excitation power is supplied to the field element 2a through the thyristor 10. In addition, the automatic controller 7 controls the gate of the thyristor 10 through the ignition angle controller 9 in accordance with the control value from the automatic control setting unit 6 so that the output voltage from the electric power generator 2 becomes a predetermined voltage.

As described above, the conventional voltage potential source excitation system has an advantage in that the construction of the system is simple and it is easy to maintain the system. However, since the excitation power is fed back from the terminal of the electric power generator, the system may be directly influenced by the variation of the terminal voltage of the electric power generator. Therefore, if the terminal voltage is decreased due to a three-phase short circuit, etc. in the output terminal of the electric power generator or in the transmission cable system, the excitation is reinforced in order to maintain a predetermined terminal voltage in the control system. However, in this case, the excitation current becomes shortage due to the decrease of the terminal voltage, namely, the excitation input voltage. Therefore, even though the excitation current becomes shortage, since there is not a mechanical rotation in the electric power generator at a short period, a synchronous failure may occur in the electric power generator due to the energy difference, whereby it is impossible to obtain a stable operation of the electric power generator.

In order to overcome the above-described problems, the current transformer is installed in the terminal of the electric power generator, so that the current source is obtained and is combined with the current voltage source in a vector method, thus supplying an excitation current. In addition, a compound source excitation system is disclosed in order to reinforce the excitation current which is supplied to the field element when a voltage is decreased due to a failure in the cable. However, this method has a disadvantage in that the capacity of the current transformer is increased, and it is impossible to correct a control integer. Therefore, this method is applicably for only a small capacity system.

SUMMARY OF THE INVENTION

Accordingly, it is an object of the present invention to provide a boost and buck chopper type potential source excitation system for a synchronous type electric power generator which overcomes the aforementioned problems encountered in the conventional art.

It is another object of the present invention to provide an improved boost and buck chopper type potential source excitation system for a synchronous type electric power generator which is capable of having an operational characteristic which is better than that of a conventional voltage source excitation system with respect to a rated input voltage and forcing an excitation field by boosting an excitation input voltage using a boost chopper when an excitation input voltage is decreased due to a failure in a cable.

To achieve the above objects, there is provided a boost and buck chopper type potential source excitation system for a synchronous type electric power generator which includes a boost chopper for receiving an output voltage from the buck transformer, converting the thusly received voltage into a direct current voltage, adjusting a level of the same, outputting the same to the thyristor as an excitation voltage, boosting the direct current voltage when the output voltage from the electric power generator is decreased, and outputting the thusly boosted voltage to the thyristor, wherein the boost chopper includes a three-phase alternating current input reactor for receiving an output voltage from the buck transformer and removing a noise therefrom, a three-phase radio rectifier for radio-rectifying an alternating current voltage from the alternating current input reactor and converting the thusly rectified voltage into a direct current voltage, a reverse prevention diode for preventing a reverse flow of the direct current from the three-phase radio rectifier and supplying an excitation power to the thyristor, a capacitor connected with an output terminal of the reverse prevention diode for charging, a direct current link unit voltage setting unit for setting a control value in order to control the excitation voltage to a voltage value to be operated, a boost chopper controller for outputting a boost control signal corresponding to a result of the comparison between a voltage charged into the capacitor and a voltage set by the direct current link unit voltage setting unit, and a boost chopper switch connected in parallel with the three-phase radio rectifier in the reverse direction with respect to the three-phase radio rectifier for being switched in accordance with a control signal from the boost chopper controller and boosting the excitation voltage from the capacitance when an output voltage from the electric power generator is decreased.

Additional advantages, objects and other features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Figure 2:
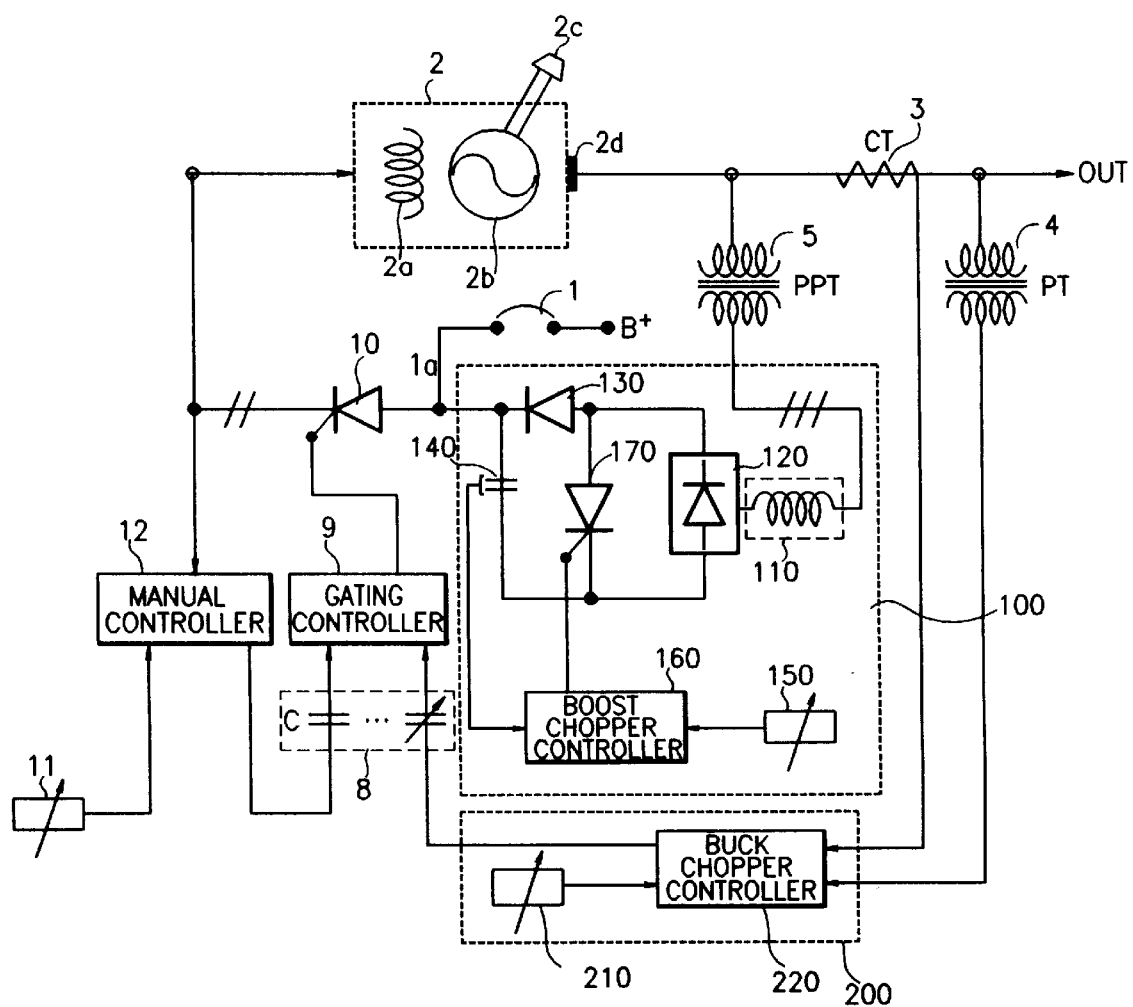
FIG. 2 is a block diagram illustrating a boost and buck chopper type potential source excitation system for a synchronous type electric power generator according to the present invention.

FIG. 2 illustrates a boost and buck chopper type potential source excitation system for a synchronous type electric power generator according to the present invention.

As shown therein, the boost and buck chopper type potential source excitation system for a synchronous type electric power generator according to the present invention includes an electric power generator 2, a buck transformer 5 for bucking a voltage from the electric power generator 2, a boost chopper 100 connected with a secondary circuit of the buck transformer 5 for boosting an input voltage and supplying the thusly boosted voltage to an excitation voltage source of the buck chopper when an output voltage from the electric power generator 2 is decreased due to a failure in the cable, an initial excitation switch 1 connected with an output terminal of the boost chopper 100 for forming a non-voltage state of the electric power generator, a current transformer 3 and a transformer 4 for receiving a terminal current signal from the electric power generator 2 and a feeding-back voltage signal, a manual control setting unit 11 for manually setting the terminal voltage value from the electric power generator 2, a manual controller 12 for manually controlling an operation in accordance with a result of the comparison between the voltage from the buck thyristor control rectifier 10 and a voltage value set by the manual control setting unit 11, a boost chopper 200 for receiving the signals converted by the current transformer 3 and the transformer 4 and outputting a boost control signal to an gating angle controller 9 through the voltage control switch 8 when the system is normally operated, an gating angle controller 9 for receiving a control signal from the manual controller 12 and a control signal from the boost controller 200, respectively, and outputting an gating angle control signal, and a boost chopper switch 10 (thyristor) connected with one end of the initial excitation switch 1 for being switched in accordance with an gating angle control signal and supplying an excitation current to the field element 2a of the electric power generator from the boost chopper 100.

Here, the boost chopper 100 drives the boost chopper switch 10 in accordance with a control of the boost chopper 200 which is transmitted thereto through a three-phase alternating current input reactor 110 and a three-phase rectifying diode 120 as the boost chopper switch 170 connected in parallel with the three-phase radio rectifying diode 120 does not operate and supplies the current to the field element 2a of the electric power generator.

In addition, the boost chopper 100 includes a three-phase alternating input reactor 110 (a leakage inductance of the potential power transformer 5 may be used instead of a leakage inductance which is indicated in a three-phase in FIG. 5) connected with a secondary circuit of the potential power transformer 5 for passing an excitation power when an input voltage is decreased, a three-phase radio rectifying diode 120 for rectifying an alternating current from the alternating current input reactor 110 and converting the thusly rectified current into a direct current signal, a capacitor 140 connected with one end of the three-phase radio rectifying diode 120 and an output terminal of a reverse prevention diode 120, respectively, for charging a signal outputted through the three-phase radio rectifying diode 120, a reverse prevention diode 130 for passing through a direct current signal from the three-phase radio rectifying diode 120 in the normal operation mode and preventing the voltage discharged by the capacitor 140 from being reversely inputted in the input voltage decrease mode, a direct current link unit voltage setting unit 150 for setting a direct current link unit voltage of the excitation system as a voltage value to be operated, a boost chopper controller 160 for outputting a boost control signal which corresponds to a result of the comparison between the voltage charged in the capacitor 140 and a voltage set by the direct current link unit voltage setting unit 150, and a boost chopper switch (GTO which performs an on/off operation in accordance with a signal applied to the gate) thyristor connected in parallel with the three-phase radio rectifying diode 120 for boosting a voltage higher than the output voltage from the secondary terminal of the boost transformer 5 and for being switched in accordance with a boost control signal from the boost chopper controller 160 for supplying the thusly boosted voltage to the boost chopper switch 10 through the capacitor 160. As another embodiment, a transistor or a semiconductor switching device such as IGBT may be used.

In addition, in the normal operation mode, the boost chopper 200 supplying a current to the field element 2a of the electric power generator includes an automatic voltage setting unit 210 for setting an operation value of the voltage of the electric power generator terminal, and a boost chopper controller 220 outputting a control signal to the ignition angle controller 9 so that the boost chopper switch 10 outputs more excitation current to the field element 2a of the electric power generator when a result voltage value which is obtained by comparing the voltage of the electric power generator terminal 2d fed back thereto through the transformer 4 with a voltage value set by the automatic voltage setting unit 210 is lower than a set voltage value.

The operation of the boost and buck chopper type potential source excitation system for a synchronous type electric power generator according to the present invention will now be explained with reference to FIG. 2.

First, in a state that an excitation power which is inputted thereinto through the terminal 2d of the electric power generator and bucked by the buck transformer 5 is normal, the three-phase alternating current input reactor 110 simply passes through the excitation power. When the output current from the electric power generator 2 is rapidly increased due to a failure in the cable, the voltage of the terminal 2d of the electric power generator is rapidly decreased contrarily to the output current from the electric power generator 2. At this time, the voltage of the terminal 2d of the electric power generator fed back thereto through the transformer 4 is compared with the set value of the automatic voltage setting unit 210, and the buck chopper controller 220 recognizes that the terminal voltage of the electric power generator is lower than the set value of the automatic voltage setting unit 210. As a result of the recognition, the buck chopper controller 220 transmits a signal to the gating angle controller 9 so that the buck chopper switch 10 such as a GTO (Gate Turn Off) supplies more excitation current to the field element 2a of the electric power generator. However, when a failure occurs in the cable, and a voltage of the terminal 2d of the electric power generator is significantly decreased, even though the buck chopper switch 10 such as the GTO is made fully conductive such as the diode, the capability of supplying an excitation voltage to a winding 2a of the field element of the electric power generator becomes proportional to the decreased of the voltage of the terminal 2d of the electric power generator, thus enabling less influence. Therefore, the voltage supplied from the electric power generator 2 to the power supply system is decreased, and a mechanical power input of the engine 2c which drives the electric power generator 2 is increased for a short time, whereby the electric power generator is operated at a high speed. Here, the electric power generator may cause a synchronous failure, thus for being separated from the electric power generation system. Therefore, the electric power generator may lose its electric power generation capability.

Therefore, in the present invention, a boost chopper is operated such that a switching on/off operation is repeatedly performed at a predetermined time and period interval using a boost chopper switch 170 which switches off the output terminal of the three-phase radio rectifying diode 120 for fully securing an excitation electric power. Namely, when the boost chopper switch 170 is switched off, in the output terminal of the alternating current reactor 110, a three-phase short circuit may occurs through the three-phase radio rectifying diode 120 and the boost chopper switch 170. The input current flows through the three-phase radio rectifying diode 120 and the boost chopper switch 170. In addition, during the short circuit period, in the three-phase alternating current input reactor 110, the current is increased and is stored as a magnetic field energy. After a predetermined time, when the boost chopper switch 170 is switched off, the energy stored in the three-phase alternating current input reactor 110 and the input power are supplied to the capacitor 140 of the direct current link unit and the buck chopper switch 10 through the reverse prevention diode 130. In addition, during the short circuit period of the boost chopper switch 170, an excitation current is supplied to the field element winding 2a of the electric power generator 2 through the buck chopper switch 10 which is driven in accordance with a control signal of the buck chopper 200. Therefore, as the boost chopper switch 170 is repeatedly switched on/off, a voltage is boosted to a voltage higher than the output voltage of the secondary terminal of the potential power transformer 5 and is supplied to the buck chopper switch 10 and is applied to the field element 2a of the electric power generator in accordance with a control of the buck chopper 200. If necessary, a higher excitation current may be supplied. Namely, the excitation forcing is available. The voltage of the terminal 2d of the electric power generator is increased by the above-described excitation forcing operation, so that it is possible to balance the output from the electric power generator 2 and a mechanical input of the engine 2C. The above-described characteristic means that the boost and buck chopper type potential source excitation system is capable of providing a field forcing capability higher than the conventional voltage source type potential source excitation system.

Figure 1:
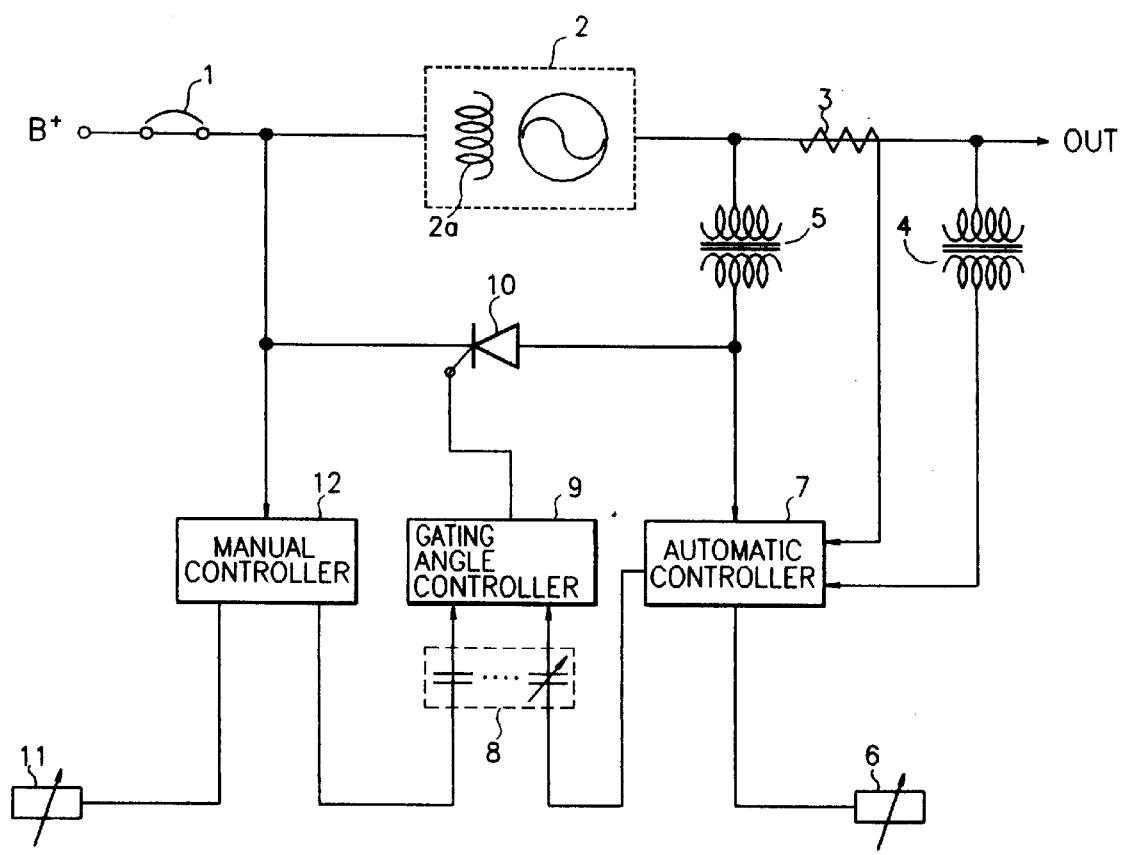
FIG. 1 is a block diagram illustrating a conventional potential source excitation system for a synchronous type electric power generator.

In addition, in the potential source excitation system, in order to obtain a predetermined initial voltage for a terminal of the electric power generator, the initial flashing (excitation) is needed. The operation of the initial excitation system of the conventional potential source excitation system is different from the operation of the initial excitation circuit of the boost and buck chopper type potential source excitation system. The conventional potential source excitation system including a voltage source potential source excitation system does not have a smooth initial voltage technique with respect to the electric power generator. Generally, since the conventional excitation system does not have a voltage control function of the initial excitation (shown in FIG. 1), in order to induce the initial excitation voltage up to a predetermined voltage which may be excited by the terminal 2d of the electric power generator, the voltage is temporarily applied to the field element 2a. The above-described operation causes a step-phase variation, and causes a mechanical stress due to the thusly caused variation. However, in the boost and buck chopper type potential source excitation system, the initial excitation (shown in FIG. 1) power is not directly applied to the field element 2a of the electric power generator and is applied to the direct current link 1a. The field current of the electric power generator is gradually increased using the buck chopper 200, and the voltage of the terminal 2d of the electric power generator is induced. Therefore, since the step-phase magnetic variation is not caused, it is possible to obtain a smooth voltage. In addition, it is possible to avoid the mechanical stress.

Figure 3:
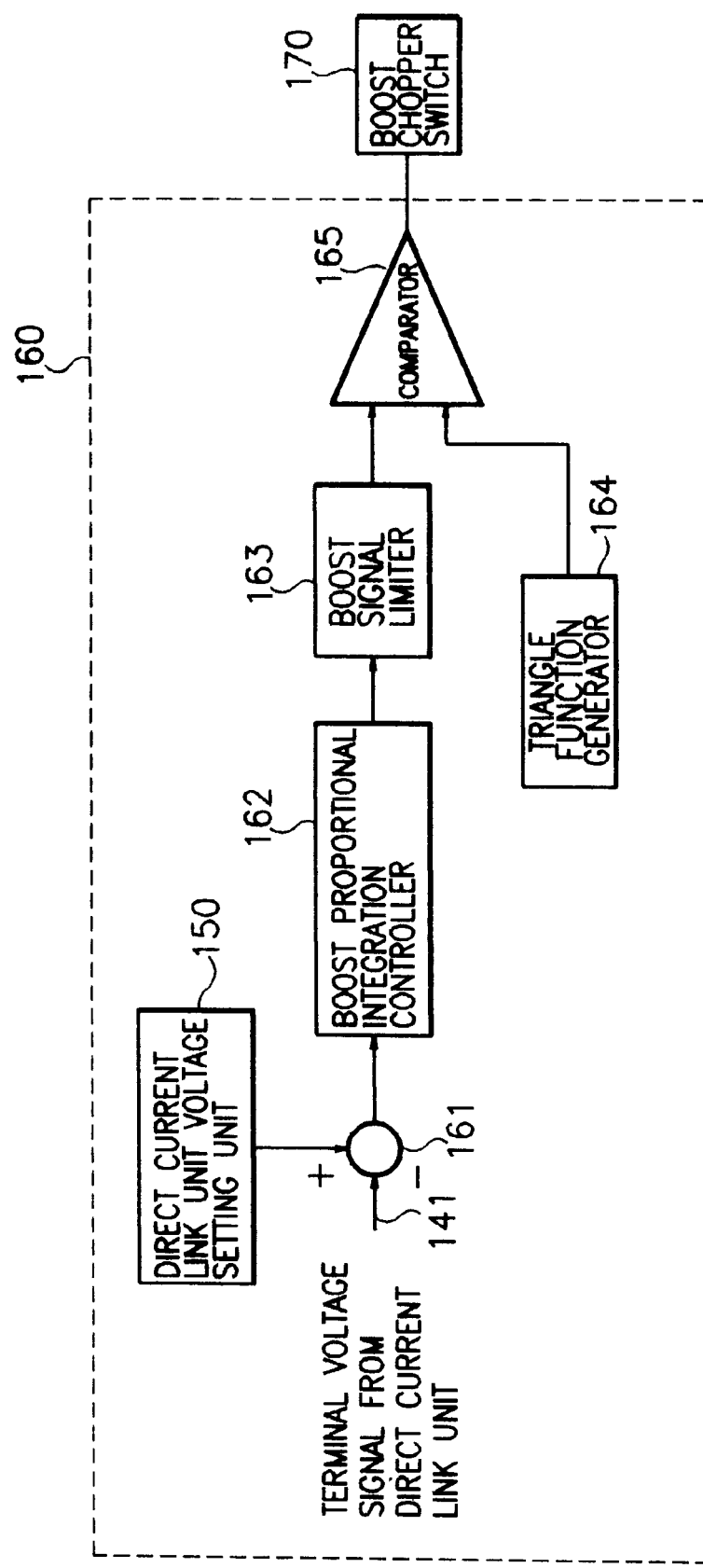
FIG. 3 is a detailed block diagram illustrating a boost and buck chopper of FIG. 2 according to the present invention.

FIG. 3 illustrates a detailed inner block construction of the boost chopper controller 160.

The boost chopper controller 160 according to the present invention includes a summing circuit 161 for summing a setting voltage signal from the direct current link unit voltage setting unit 150 which is set by a value by which both end voltages of the capacitor 140 which is the voltage of the direct current link unit of the excitation system and a terminal voltage signal 141 of the direct current link unit which is the voltage of both ends of the capacitor 140, a boost proportional integration controller 162 for receiving an error which occurs due to a result of the summing, a boost signal limiter 163 for limiting a boost signal to a predetermined level, a triangle shaped generator 164 for generating a triangle shaped wave, and a comparator 165 for comparing the triangle shaped wave generated by the triangle shaped generator 164 with the signal from the boost signal limiter 163 and generating an on/off signal for controlling the boost chopper switch 170.

The boost chopper controller 160 does not drive the boost a chopper switch 170 because the terminal voltage signal from the direct current link unit is larger than the side of the automatic voltage setting unit of the direct link unit under the normal excitation input condition. When the terminal voltage of the direct current link unit becomes lower than the set value of the automatic voltage setting unit 150 due to the failure in the system, the input is boosted by a switching operation of the boost chopper switch 170, and the voltage of the direct current link unit is maintained. In addition, if the input voltage is greatly lowered, even though it is impossible to maintain a constant voltage, the voltage which is higher than the output voltage of the radio rectifying diode 120 is supplied to the buck chopper switch 10, thus reinforcing the excitation.

In other words, the actual buck chopper controls the terminal voltage of the electric power generator, and the boost chopper controls the voltage of the direct current unit to be constant.

Figure 4A:
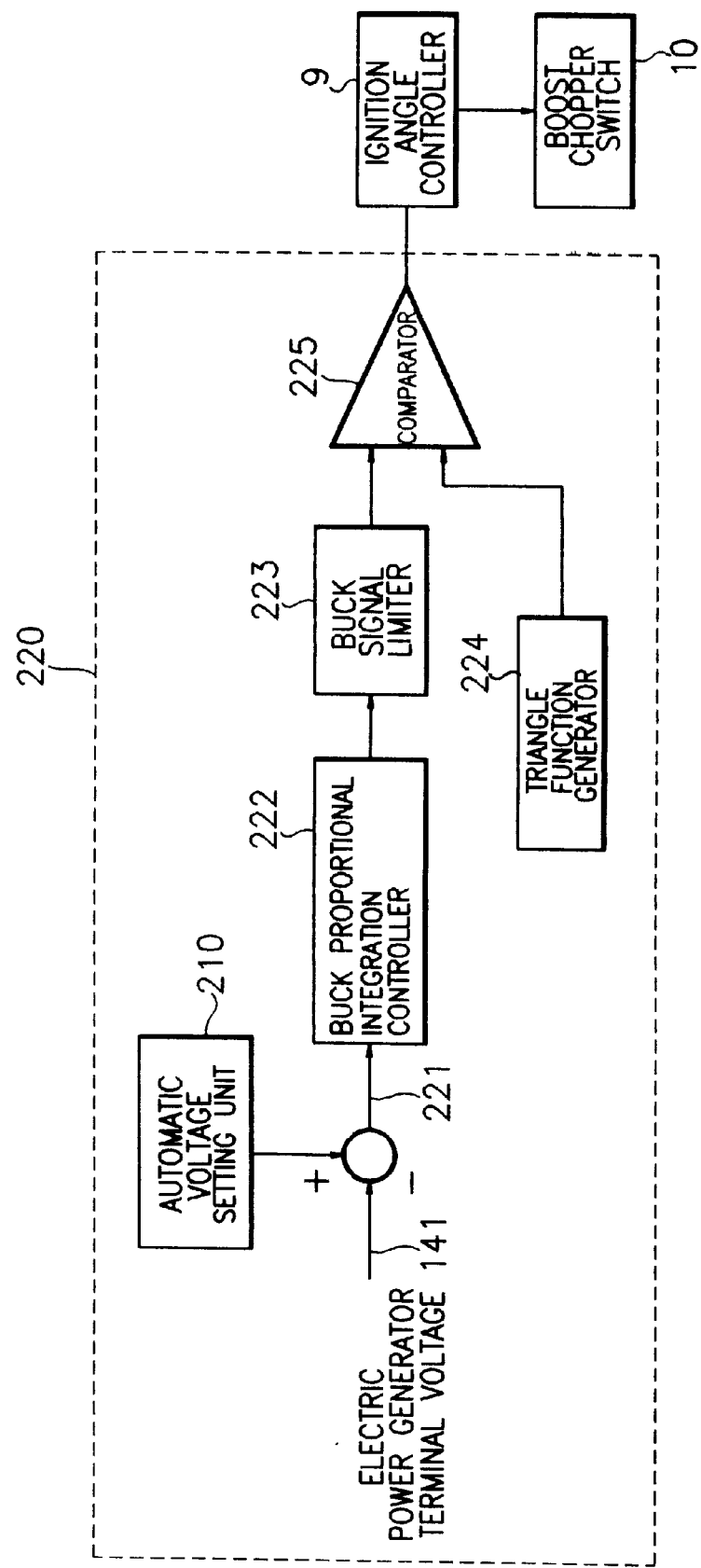
FIG. 4A is a detailed block diagram illustrating an inner construction of a buck chopper of FIG. 2 according to an embodiment of the present invention.
Figure 4B:
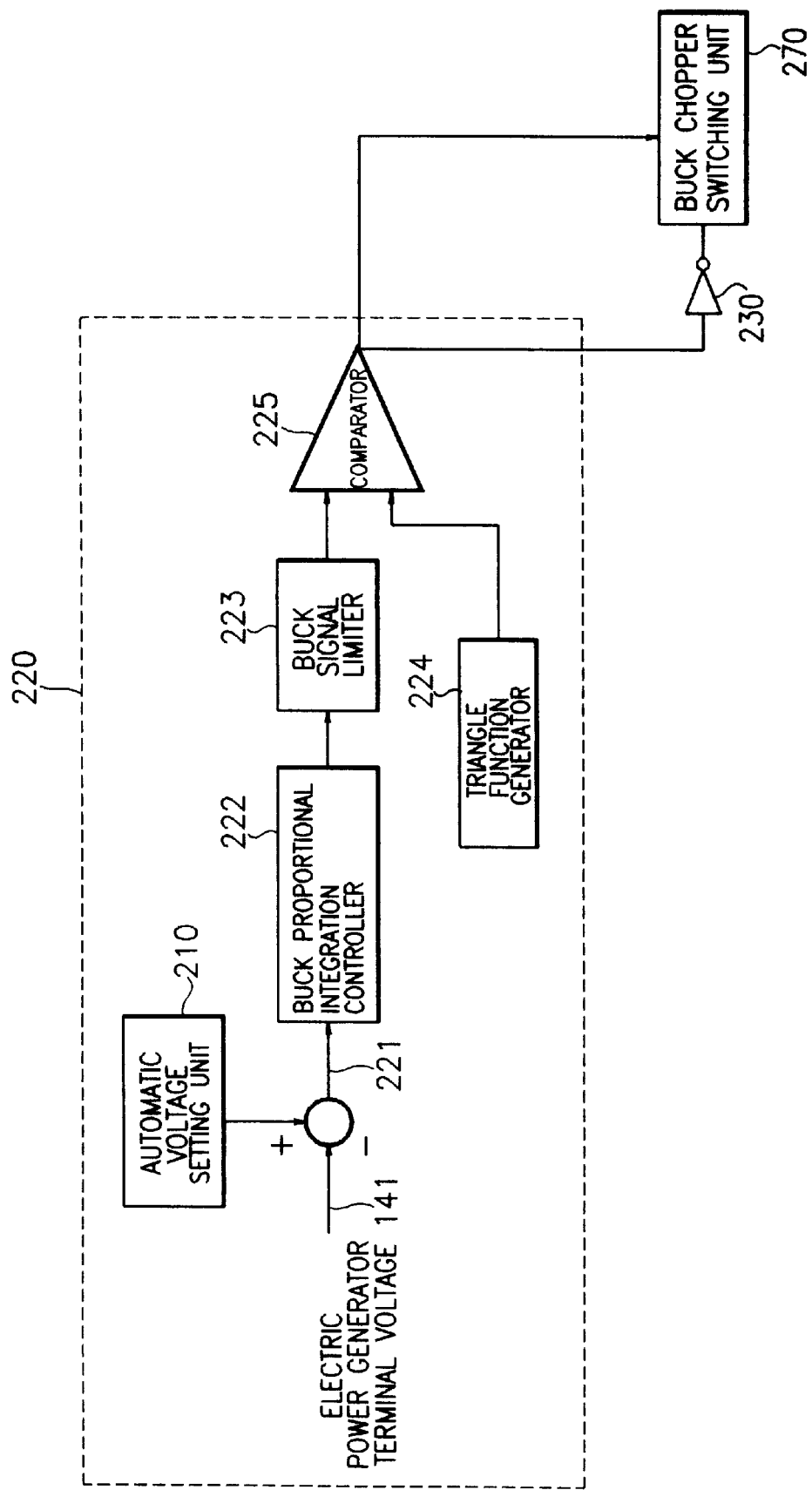
FIG. 4B is a detailed block diagram illustrating an inner construction of a buck chopper of FIG. 2 according to another embodiment of the present invention.
Figure 5A:
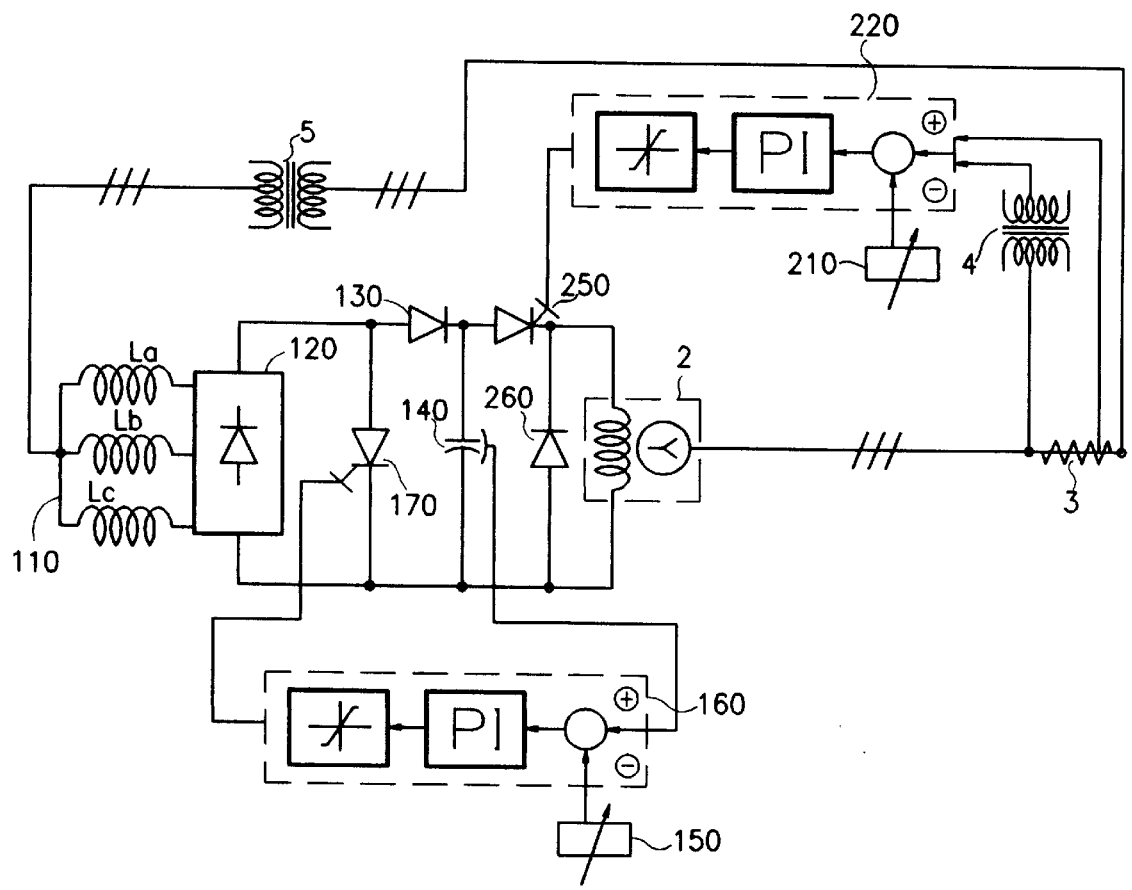
FIG. 5A is a circuit diagram illustrating a boost chopper of a boost and buck chopper type potential source excitation system for a synchronous type electric power generator according to another embodiment of the present invention.
Figure 5B:
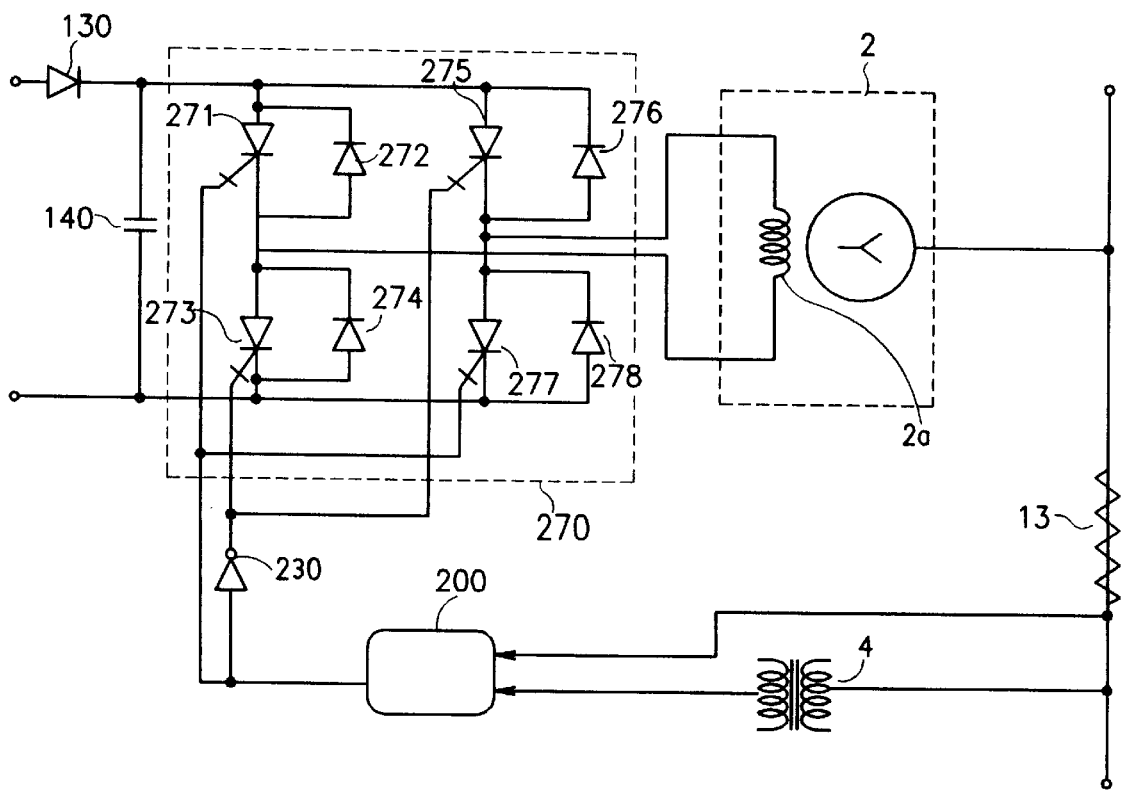
FIG. 5B is a circuit diagram illustrating a boost chopper of a boost and buck chopper type potential source excitation system for a synchronous type electric power generator according to still another embodiment of the present invention.

FIG. 4A illustrates an inner construction of a buck chopper of FIG. 2 according to an embodiment of the present invention which is adapted to the embodiment of FIG. 5A using one switching device gate, and FIG. 4B illustrates an inner construction of a buck chopper of FIG. 2 according to another embodiment of the present invention which is adapted to the embodiment of FIG. 5B based on the construction of FIG. 4A.

As shown therein, the buck chopper according to the present invention includes a summing circuit 221 for creating a setting signal of the automatic voltage setting unit 210 for setting the voltage of the terminal 2d of the electric power generator as a value to be used and a terminal voltage signal 141 of the electric power generator by processing the output signal from the transformer and summing the same, a buck proportional integration controller 222 for processing the summed variation, a buck signal limiter 223 for limiting the control signal from the controller 222 to a predetermined signal, a generator 224 for generating a triangle shaped wave, and a comparator 225 for comparing the output signal from the buck signal limiter 223 with a triangle shaped wave generated by the triangle shaped wave generator 224, inputting the signal into the buck chopper switch 10 (which corresponds to reference numeral 250 in FIG. 5A) through the ignition angle controller 9, and controlling the buck chopper.

FIG. 4B illustrates the construction which is identical to the construction of FIG. 4A. Namely, the comparison signal from the comparator 225 is inverted by the inverter 230 and then is applied to the gates of two switching devices among four switching devices of the buck chopper switching unit 270 as shown in FIG. 5B, and the comparison signal from the comparator 225 is outputted to the gates of the remaining two switching devices.

Here, the buck chopper controller 220 is configured similarly with the voltage source potential source excitation system in the normal operation state and has a better characteristic. In addition, the control system of the buck chopper may be differently configured based on the construction of the buck chopper.

FIG. 5A illustrates a boost chopper of a boost and buck chopper type potential source excitation system for a synchronous type electric power generator according to another embodiment of the present invention, which uses one switching device 250 and one freewheeling diode 260. Namely, there are provided a freewheeling diode 260 which is connected in parallel with the field element 2a of the electric power generator and circulates the electric signals and a switching device 250 connected between the output terminal of the reverse prevention diode 130 and the output terminal of the freewheeling current diode 260 for switching in accordance with a buck chopper control signal from the buck chopper controller 220.

FIG. 5B illustrates a boost chopper of a boost and buck chopper type potential source excitation system for a synchronous type electric power generator according to still another embodiment of the present invention which uses four switching devices 271, 273, 275 and 277 and four diodes 272, 274, 276 and 278.

As shown therein, the boost chopper of a boost and buck chopper type potential source excitation system for a synchronous type electric power generator according to the present invention includes first and fourth thyristors 271 and 277 connected with both ends of the field element 2a of the electric power generator for switching in accordance with a buck control signal from the buck chopper 200, first and fourth reverse current prevention diodes 272 and 278 connected in parallel with the first and fourth thyristors, respectively, for preventing a reverse current flow, an inverter 270 for inverting the buck control signal from the buck chopper 200, second and third thyristors 273 and 275 connected with both ends of the field element 2a of the electric power generator for being operated in accordance with the inverted signal by the inverter 270, alternately with respect to the first and fourth thyristors 271 and 277, and second and third reverse current prevention diodes 274 and 276 connected in parallel with the second and third thyristors, respectively, for preventing a reverse current flow. The energy may be recycled based on the construction, and the positive characteristic has a quick operation characteristic compared with the conventional voltage source potential source excitation system.

Figure 6:
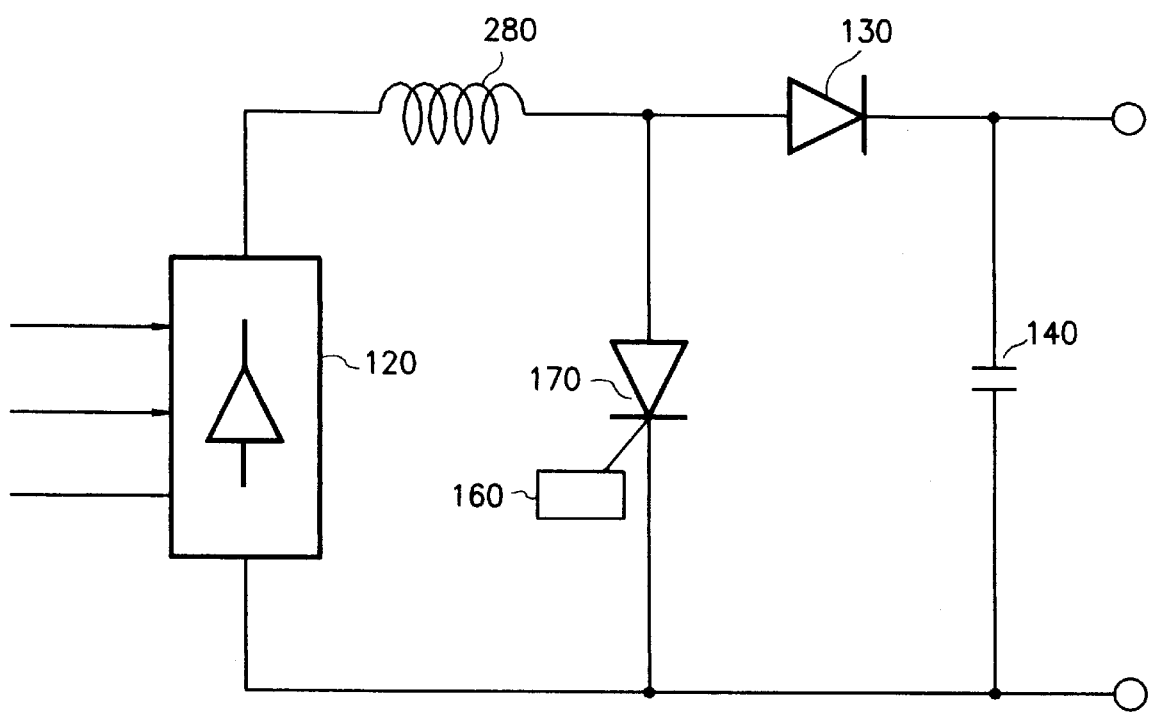
FIG. 6 is circuit diagram illustrating a boost chopper according to still another embodiment of the present invention.

FIG. 6 is circuit diagram illustrating a boost chopper according to still another embodiment of the present invention. As shown therein, a direct current reactor 280 is commonly connected with the output terminal of the radio rectifying diode 120 and the input terminals of the reverse prevention diode 130 and the boost chopper switch 170, respectively, for passing a direct current from the radio rectifying diode 120. Namely, the direct current reactor 280 is used instead of the alternating current input reactor 110.

As described above, it is possible to more easily install the boost and buck chopper type potential source excitation system for a synchronous type electric power generator according to the present invention and maintain the system at a lower cost. In addition, it is possible to reinforce the excitation when a three-phase short circuit, a failure which occurs in the cable, etc. occur in the system. Furthermore, a stable operation of the electric power generator is obtained. The dynamic characteristic has a quick characteristic which is quicker than the conventional voltage source potential source excitation method.

Although the preferred embodiments of the present invention have been disclosed for illustrative purposes, those skilled in the art will appreciate that various modifications, additions and substitutions are possible, without departing from the scope and spirit of the invention as recited in the accompanying claims.

What is claimed is:

1. In a boost and buck chopper type potential source excitation system for a synchronous type electric power generator including an electric power generator, and a buck transformer for bucking a voltage from an output terminal of the electric power generator, wherein the output voltage is bucked by the buck transformer, an excitation power is supplied to a field element of the electric power generator through a thyristor, and an ignition angle of the thyristor is controlled so that the output voltage from the electric power generator becomes a predetermined voltage, the improvements, comprising:

a boost chopper for receiving an output voltage from the buck transformer, converting the thusly received voltage into a direct current voltage, adjusting a level of the same, outputting the same to the thyristor as an excitation voltage, boosting the direct current voltage when the output voltage from the electric power generator is decreased, and outputting the thusly boosted voltage to the thyristor.

2. The system of claim 1, wherein said boost chopper includes:

a three-phase alternating current input reactor for receiving an output voltage from the buck transformer and removing a noise therefrom;

a three-phase radio rectifier for radio-rectifying an alternating current voltage from the alternating current input reactor and converting the thusly rectified voltage into a direct current voltage;

a reverse prevention diode for preventing a reverse flow of the direct current from the three-phase radio rectifier and supplying an excitation power to the thyristor;

a capacitor connected with an output terminal of the reverse prevention diode for charging;

a direct current link unit voltage setting unit for setting a control value in order to control the excitation voltage to a voltage value to be operated;

a boost chopper controller for outputting a boost control signal corresponding to a result of the comparison between a voltage charged into the capacitor and a voltage set by the direct current link unit voltage setting unit; and a boost chopper switch connected in parallel with the three-phase radio rectifier in the reverse direction with respect to the three-phase radio rectifier for being switched in accordance with a control signal from the boost chopper controller and boosting the excitation voltage from the capacitance when an output voltage from the electric power generator is decreased.

3. The system of claim 2, wherein a direct current reactor is connected between an output terminal of the three-phase radio rectifier and the boost chopper switch instead of the alternating current input reactor.

4. The system of claim 2, wherein said boost chopper switch is selected from the group comprising a thyristor, a transistor, and a semiconductor switching device such as an IGBT.

5. The system of claim 2, wherein said boost chopper controller includes:

a summing circuit for summing a setting voltage signal from the direct current link unit voltage setting unit which sets a both end voltage from the capacitor, which is a direct current link unit voltage of the excitation system, as a voltage to be operated and a terminal voltage signal from the direct current link unit which is a both end voltage of the capacitor;

a boost proportional integration controller for receiving and processing an error based on a result of the summing;

a boost signal limiter for limiting the thusly processed boost signal to a predetermined value;

a triangle shaped wave generator for generating a triangle shaped wave; and a comparator comparing the triangle shaped wave generated by the triangle shaped wave generator with a signal from the boost signal limiter and outputting a control signal of the boost chopper switch.

6. The system of claim 1, wherein said buck chopper includes:

an automatic voltage setting unit for setting an operational value of the electric power generator terminal voltage; and a buck chopper controller for outputting a control signal to the ignition angle controller so that the buck chopper switch supplies more excitation current to a field element of the electric power generator when the voltage of the terminal of the electric power generator fed back through the transformer is lower than a setting voltage value as a result of the comparison therebetween.

7. The system of claim 6, wherein said buck chopper controller includes:

a summing circuit for processing a setting signal from the automatic voltage setting unit as a value for operating the voltage of the terminal of the electric power generator and an output signal from the transformer, creating an electric power generator terminal voltage signal, receiving the feeding back signal, and summing the same;

a buck proportional integration controller for processing the thusly summed variation;

a buck signal limiter for limiting a control signal from the controller to a predetermined signal;

a generator for generating a triangle shaped wave; and a comparator for comparing an output signal from the buck signal limiter and a triangle shaped wave from the triangle shaped generator and controlling a buck chopper switch through the ignition angle controller.

8. The system of claim 7, further comprising:

an inverter for inverting a comparison signal from the comparator; and more than one switching device gate driven in accordance with the inverting signal.

9. The system of claim 1, further comprising:

a freewheeling current diode connected in parallel with the electric power generator field element for circulating an electrical signal; and a switching device connected between an output terminal of the reverse prevention diode and an output terminal of the freewheeling current diode for switching in accordance with a buck chopper control signal from the buck chopper controller.

10. The system of claim 1, further comprising:

first and fourth switching devices connected with both ends of the electric power generator field element for being switched in accordance with a buck control signal from the buck chopper;

first and fourth reverse current prevention diodes connected in parallel for preventing a reverse current;

an inverter for inverting a buck control signal from the buck chopper;

second and third switching devices connected with both ends of the electric power generator field element for being switched in accordance with the signal inverted by the inverter which are alternately operated with respect to the first and fourth switching devices; and second and third reverse current prevention diodes connected in parallel with the second and third switching devices for preventing a reverse current.

11. The system of claim 10, wherein said first through fourth switching devices are selected from the group comprising a thyristor, a transistor, and a semiconductor switching device such as IGBT.

* * * * *